United States Patent Office 2,748,329
Patented May 29, 1956

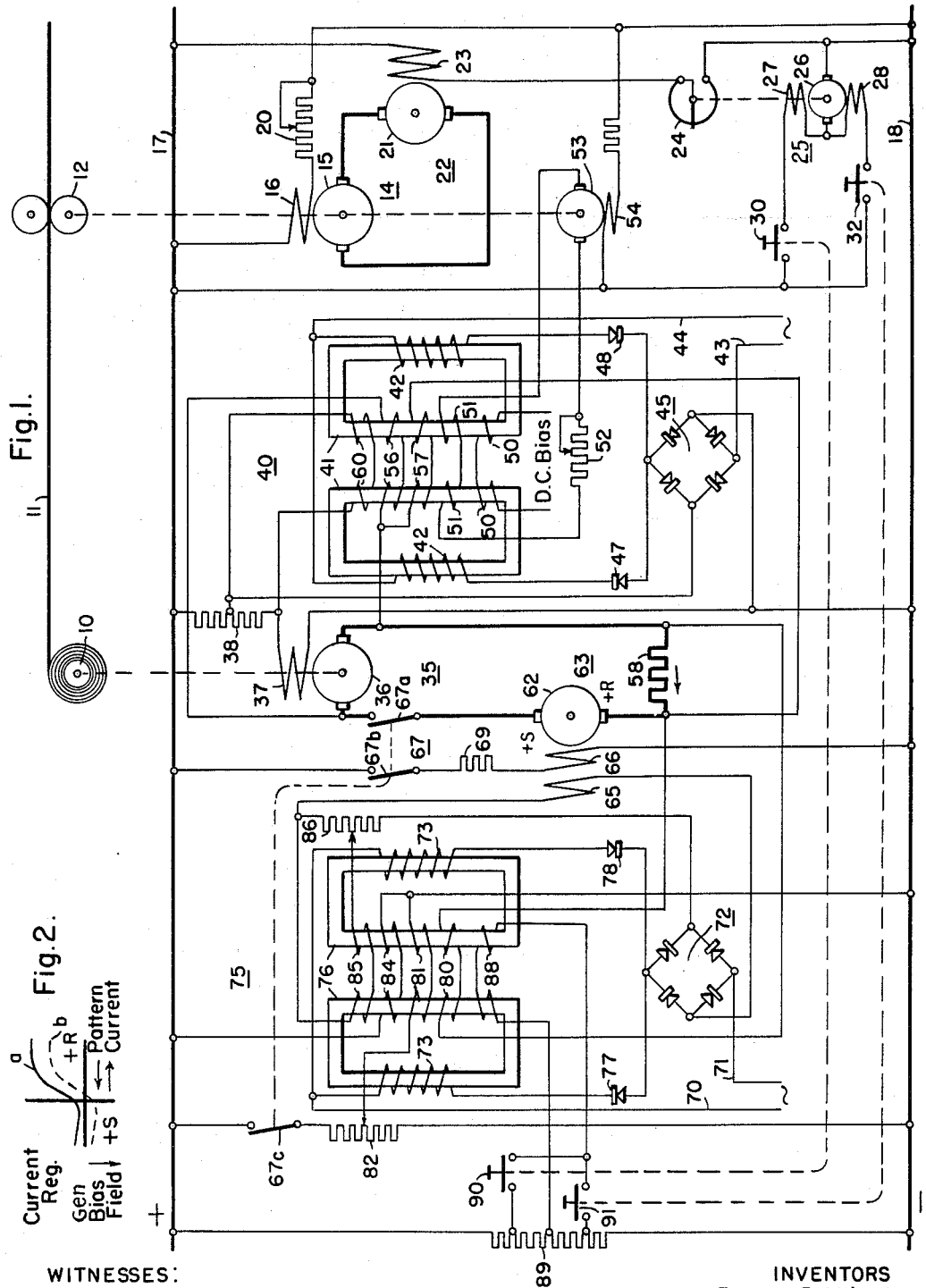

2,748,329

REEL AND TENSION CONTROL SYSTEM

Eugene F. Allbert, Buffalo, and Raymond W. Moore, Snyder, N. Y., assignors to Westinghouse Electric Corporation, East Pittsburgh, Pa., a corporation of Pennsylvania Application October 29, 1954, Serial No. 465,690

7 Claims. (Cl. 318—6)

Our invention relates generally to reel control systems and it has reference particularly to a control system for the drag generator of an unwinding reel.

Generally stated, it is an object of our invention to provide for using magnetic amplifiers to regulate the field and armature currents of a drag generator in a reel control system.

More specifically, it is an object of our invention to provide for using a single stage self-saturating magnetic amplifier to regulate the armature current of a drag generator for both stalled and running tension.

Another object of our invention is to provide in a reel system for using a bias field winding on a generator connected to a drag generator so as to provide for using the main field winding of the generator to regulate the armature current of the drag generator for both stalled and running tension.

Yet another object of our invention is to provide in a reel drive for using a bias field winding on the main generator so that the direction of current in the drag generator armature is not reversed between stalled and running conditions, whereby the transition may be made without the use of reversing contactors.

Other objects will in part be obvious, and will in part be explained hereinafter.

In practicing our invention in one of its forms the field of a drag generator is regulated from a minimum weak field condition by a magnetic amplifier responsive to the speed of the mill and the electromotive force of the drag generator. The armature of the drag generator is connected to a main generator having differential main and bias field windings. The bias field winding is energized in a direction to cause circulation of a normal value of armature current in the drag generator in the normal direction under stalled conditions, while the main field winding is controlled by a magnetic amplifier to regulate the armature current for both stalled and running tension conditions.

For a more complete understanding of the nature and scope of our invention, reference may be made to the following detailed description which may be read in connection with the accompanying drawing, in which—

Fig. 1 is a diagrammatic view of a real drive embodying the invention in one of its forms; and Fig. 2 shows the characteristic curves for the current regulator used in the system of Fig. 1.

Referring to Fig. 1 of the drawing, the reference numeral 10 designates an unwinding reel used for supplying a strip or web 11 to a work device such as the rolls 12 of a mill stand or the like. The rolls 12 are driven by a mill motor 14 having an armature 15 connected in driving relation with the rolls and having a field winding 16. The field winding 16 is connected to a direct current source represented by conductors 17 and 18, through a rheostat 20. The armature 15 is connected in circuit with the armature 21 of a generator 22 having a field winding 23. The field winding 23 is connected to the conductors 17 and 18 through a motor-operated field rheostat 24 having a motor 25 with an armature 26 and opposed field windings 27 and 28 for actuating the rheostat to vary the output voltage of the generator 22 for obtaining different speeds of the rolls 12. Suitable control means represented by the push button switches 30 and 32 are provided for connecting the windings 27 and 28 to the conductors 17 and 18 to operate the rheostat 24 in opposite directions to raise and lower the voltage of generator 22 and hence the speed of the rolls 12.

For the purpose of controlling the reel 10 to maintain a desired tension in the strip 11, a drag generator 35 is connected to the reel comprising an armature 36 mechanically coupled to reel 10, and a field winding 37. The field winding 37 is connected to the conductors 17 and 18 through a resistor 38 for providing a minimum value of field excitation. Energization of the field winding 37 is regulated above this minimum value by means of a magnetic amplifier type regulator 40. The magnetic amplifier 40 comprises a pair of cores 41 of magnetic material each having an alternating current load winding 42 disposed thereon and connected in parallel circuit relation between an alternating current source represented by the conductors 43 and 44 and the input terminals of a rectifier bridge circuit 45. The output terminals of the rectifier bridge circuit are connected across the field winding 37 and a portion of the resistor 38 for the purpose of increasing the excitation of the field winding above the minimum weak field value. Rectifier devices 47 and 48 are connected in series with the load winding 42 in opposed senses so as to provide for self-saturation of the magnetic core members 41. The core members 41 are each provided with a bias field winding 50 connected to a source of direct current and opposing the magnetic effects of the load windings. Pattern field windings 51 are provided on the core members being cumulative with respect to the load winding 42. These pattern field windings are energized through a draft compensation rheostat 52 from a pilot generator 53 driven by the mill motor 14 and provided with a field winding 54 energized from the conductors 17 and 18 so as to provide a voltage proportional to the speed of the mill. Voltage windings 56 are provided on the core members 41 connected across the armature 36 of the drag generator and differential with respect to the load windings. IR drop current windings 57 on each of the core members are connected across a resistor 58 in series circuit relationship with the armature 36 of the drag generator for operating cumulatively with the voltage winding to produce a net effect proportional to the electromotive force of the drag generator and hence the speed thereof. Self-energizing windings 60 are provided on each of the core members which are connected across a portion of the resistor 38 adjacent the field winding 37 so as to be energized in accordance with the current in the drag generator field winding. These windings are cumulative with respect to the load windings. The net effect of the windings on the magnetic amplifier 40 will be to control the excitation of the field winding 37 in accordance with the mill speed and the E. M. F. of the drag generator to maintain a substantially constant value of electromotive force of the drag generator for a given speed of the mill.

The armature 36 of the drag generator is connected in series with the armature 62 of a generator 63 driven by a suitable prime mover and provided with main and differential bias field windings 65 and 66 respectively. The armature 62 is connected in circuit with the drag generator 36 by means of a suitable switch 67 having a contact 67a connecting the armatures in a closed circuit and a contact member 67b connecting the bias winding 66 to the conductors 17 and 18 through the current limiting resistor 69 so as to provide an output voltage in a reverse direction for maintaining substantially normal armature current when the drag generator is stalled. A third contact 67c is used with a current regulator as hereinafter described. The main field winding 65 is connected to an alternating current source represented by the conductors 70 and 71 through a rectifier bridge circuit 72 and the load windings 73 of a magnetic amplifier 75 for regulating the energization of the field winding to maintain a substantially constant value of armature current.

The magnetic amplifier circuit 75 comprises magnetic core members 76 carrying the load winding 73, which are connected in substantially parallel circuit relationship with oppositely disposed rectifier devices 77 and 78 for obtaining self-saturation of the core members. Current windings 80 are provided on each of the core members and connected across the resistors 58 and the armature circuit so as to be energized cumulatively with respect to the load windings. Differential pattern windings 81 are provided on each of the core members and connected to the conductors 17 and 18 through a rheostat 82 for determining the value of armature current to be regulated by the magnetic amplifier. Bias windings 84 opposing the load circuit windings are provided on the core members being energized by the conductors 17 and 18. Self-energizing windings 85 are provided on each of the core members and are connected across a resistor 86 in circuit with the main field winding 65 so as to be cumulative with respect to the load windings. Inertia compensation windings 88 are provided on each of the core members and are arranged to be selectively connected to different sections of a tapped resistor 89 so as to be either additive or subtractive with respect to the pattern windings, and therefore, differential or cumulative with respect to the load windings, depending on whether the mill is accelerating or decelerating. This effect is obtained by connecting the winding 88 to the resistor 89 through switches 90 and 91 which are operatively connected with the raise and lower push buttons 30 and 32 of the mill rheostat motor 25.

When it is desired to maintain stalled tension, the switch 67 is closed, connecting the armature 36 of the drag generator to the armature 62 of the generator 63 connecting the bias field winding 66 and the rheostat 82 to the conductors 17 and 18. Accordingly, the bias field winding 66, being differential with respect to the main field winding 65, provides an output voltage in a direction and of a value sufficient to force a current equal to full load current through the stalled armature 36 of the drag generator in a direction to cause the drag generator to act as a motor and apply tension to the strip 11, which is held between the rolls 12. Under these conditions the current regulator 75 will be effective to regulate for a normal value of current in the armature circuit of the drag generator or any fraction thereof, dependent on the setting of rheostat because the pattern field windings 81 are energized from the conductors 17 and 18 through contact 67c to determine the value of current to be regulated for, and the current windings 80 are energized in accordance with the current in the armature circuit through the resistor 58. The main field winding 65 will thereby be energized to regulate the current in the armature circuit, by opposing the effects of the bias field winding 66 to the extent necessary. Whereas the normal regulating effect of the magnetic amplifier 75 alone may be represented by the curve a in Fig. 2, because of the differential effect of the bias field winding 66, the net effect of the regulating on the generator 63 is represented by the curve b, which is displaced downwardly from curve a by reason of the opposing effect of generator field winding 66, wherein it will be seen that the output may vary from a positive value above the horizontal axis to a negative value below the axis in order to maintain tension under stalled as well as running conditions. The curve a is thus displaced in the direction of the "Bias Field" arrow which represents the effect of generator bias field winding 66 on the magnetic amplifier regulating curve, to produce the resultant curve b. The +S and +R in Fig. 2 refer to the polarities of the generator 63 as indicated in Fig. 1, for the stalled and running conditions respectively.

During operation, the electromotive force magnetic amplifier 40 operates in the usual manner as determined by any differential between the pattern winding 51 energized from the pilot generator 53 and the voltage and current windings 56 and 57 to maintain a substantially constant value of electromotive force for the drag generator 35. When the mill is running, the strip 11 will in effect be driving the drag generator 35, and the electromotive force thereof will tend to force a current through the generator 63 in the same direction as the current produced by the bias field winding 66 and any increase in current through the resistor 58 causes the current regulator 75 to increase the energization of the main field winding 65. This opposes the effect of the bias field winding 66 and the drag generator and introduces an output voltage in the armature 62 in a direction to oppose any increase in armature current and thus maintain the armature current at the predetermined desired value.

From the above description and the accompanying drawing, it will be apparent that we have provided a simple and effective manner for regulating the tension of a strip or web of material by means of a drag generator under both stalled and running conditions. Since the current in the armature circuit of the drag generator thereof is in the same direction during both stalled and running conditions, no reversal takes place and reversing contactors are not necessary in any of the circuits. By utilizing a differential bias field winding on the generator connected in circuit with the drive generator, regulation of the armature current is continuously effected over the full operating range from stalled to running conditions with a single channel magnetic amplifier.

Since certain changes may be made in the above described construction, and different embodiments of the invention may be made without departing from the spirit and scope thereof, it is intended that all the matter contained in the above description and shown in the accompanying drawing, shall be interpreted as illustrative and not in a limiting sense.

We claim as our invention:

1. In a control system for a dynamoelectric machine having an armature and a field winding, regulating means for regulating excitation of the field winding to maintain a predetermined value of E. M. F., a generator having an armature connected in circuit with the dynamoelectric machine armature and having field excitation means, bias means for effecting energization of the field excitation means in one sense, and additional regulating means responsive to the current in the armature, for effecting energization of the field excitation means in the opposite sense to maintain a predetermined value of armature current.

2. A control system for a drag generator having an armature and a field winding comprising, a generator having an armature and a plurality of field windings, circuit means connecting the armatures in a closed circuit, regulating means responsive to the E. M. F. of the drag generator and the speed of an associated work device for regulating excitation of the drag generator field winding to maintain a substantially constant value of E. M. F., circuit means connecting one of said plurality of field windings to a source of bias voltage for producing a stalled tension current in the armature circuit, and additional regulating means responsive to the armature current for effecting energization of another of said plurality of field windings in an opposite sense for regulating the value of the armature current under stalled and running conditions.

3. In a control system for a motor having an armature connected in driving relation with an unwinding reel for supplying a material to an adjacent work device and having a field excitation means, a generator having an armature connected in a closed circuit with the motor armature and having field excitation means, circuit means for effecting energization of the motor excitation means, bias means for effecting energization of the generator excitation means in a sense to produce a current in the motor armature to cause the motor to exert a predetermined pull on the material when the work device is stalled, and regulating means responsive to the armature current for effecting energization of the generator excitation means in an opposite sense for regulating the armature current during both stalled and running conditions.

4. The combination with a drag generator having an armature and a field winding, of circuit means including an impedance device connecting the field winding to a source of excitation for maintaining a predetermined minimum value of excitation, regulating means for regulating said excitation to maintain a predetermined E. M. F. for a given mill speed, a generator having an armature connected in circuit with the drag generator armature and having a plurality of field windings, circuit means connecting one of said plurality of windings to cause the generator to circulate substantially full load current in the armature circuit under stalled mill conditions, and unidirectional regulating means connecting another of said plurality of windings to effect energization thereof in an opposite sense for regulating the armature current under stalled and running conditions.

5. In a control system for a drag generator having an armature driven by a strip of material being pulled from a reel connected thereto during running conditions of a mill to which the trip is supplied and having a field winding, impedance means connecting the field winding to a source of excitation to provide a minimum weak field excitation, a magnetic amplifier having load windings connecting the field winding to an alternating current source through a rectifier bridge circuit and having control and pattern windings energized in accordance with the E. M. F. of the drag generator and the speed of the mill, respectively, for regulating the energization of the field winding to maintain a predetermined relation therebetween, a generator having an armature connected in series with the drag generator armature and having a plurality of field windings, circuit means connecting one of said plurality of windings to a source of bias excitation to circulate a current in the armature circuit in a direction to tension the strip when the mill is stalled, and means including a magnetic amplifier connecting another of said plurality of field windings for effecting energization thereof in the opposite sense for regulating the armature current during stalled and running conditions.

6. A control system for a drag generator having an armature and a field winding comprising, circuit means including an E. M. F. regulator connecting the field winding to a source of electrical energy, a generator having an armature and having a plurality of field windings, circuit means connecting one of said plurality of windings to produce an output opposite in polarity to normal under-stalled conditions, and means comprising a magnetic amplifier of the self-saturating type connecting another of said plurality of windings to produce an output of opposite polarity, said magnetic amplifier having opposed excitation windings energized in accordance with the armature current and a reference quantity for maintaining a predetermined value of armature current under stalled and running conditions.

7. In a control system for a motor connected to an unwinding reel to act as a drag generator therefor and having a field winding, impedance means for connecting the field winding to a source of excitation for providing a minimum weak field excitation, regulating means connected in circuit with the field winding for varying the excitation thereof to maintain a predetermined E. M. F. for a given strip speed, a generator having an armature connected in a closed circuit with the motor armature and having a pair of field windings, impedance means connecting one of the pair of windings to provide an output in the reverse of the normal direction for circulating substantially full load current under stalled conditions, and a current regulator comprising a self-saturating magnetic amplifier connecting the other of said pair of windings to produce an output in a normal direction to oppose the E. M. F. of the motor, said magnetic amplifier having opposed control windings energized in accordance with the armature current and a reference quantity for maintaining a predetermined value of current.

No references cited.